May 21, 1968 M. COOPERMAN 3,384,760

SWITCHING SYSTEM INCLUDING INTERLACED GROUPS OF BISTABLE SWITCHING CIRCUITS

Filed Dec. 17, 1964 5 Sheets-Sheet 1

INVENTOR.

MICHAEL COOPERMAN

BY John V. Regan

ATTORNEY

INVENTOR.
MICHAEL COOPERMAN
BY John V. Regan
ATTORNEY

INVENTOR.
MICHAEL COOPERMAN
BY John V. Regan
ATTORNEY

May 21, 1968 M. COOPERMAN 3,384,760

SWITCHING SYSTEM INCLUDING INTERLACED GROUPS OF BISTABLE SWITCHING CIRCUITS

Filed Dec. 17, 1964 5 Sheets-Sheet 4

INVENTOR
MICHAEL COOPERMAN
BY John V. Regan
ATTORNEY

May 21, 1968 M. COOPERMAN 3,384,760

SWITCHING SYSTEM INCLUDING INTERLACED GROUPS OF BISTABLE SWITCHING CIRCUITS

Filed Dec. 17, 1964 5 Sheets-Sheet 5

INVENTOR.
MICHAEL COOPERMAN
BY John V. Regan
ATTORNEY

United States Patent Office 3,384,760

Patented May 21, 1968

3,384,760

SWITCHING SYSTEM INCLUDING INTERLACED GROUPS OF BISTABLE SWITCHING CIRCUITS

Michael Cooperman, Cherry Hill, N.J., assignor to Radio Corporation of America, a corporation of Delaware Filed Dec. 17, 1964, Ser. No. 418,979
5 Claims. (Cl. 307—221)

ABSTRACT OF THE DISCLOSURE

A switching system includes first and second rows of bistable switching circuits that are cross-coupled by means of delay storage circuits to form first and second interlaced groups. The first and second rows of bistable circuits are normally deenergized and nonconductive. First and second trains of complementary clock signals are applied respectively to the first and second rows of circuits to energize each of the bistable circuits in one row to enable them to be set upon receipt of input signals and to simultaneously deenergize each of the bistable circuits of the other row to unconditionally reset them. Input signals applied in common to the first circuit of each row are thereby transferred into the switching system at double the repetition rate of the clock energizing signals.

This invention relates to switching systems, and more particularly relates to high-speed switching systems.

In attempts to provide logic switching circuits which operate at gigacycle frequencies, tunnel diode switching circuits have been utilized because of their fast switching speeds. However, a limitation exhibited by tunnel diode switching circuits, such as shift register systems, is that no information can be processed during the resetting of these circuits to their initial state. This resetting, or recovery time, places a limitation on the speed at which information can be processed. This limitation is also exhibited by switching circuits other than tunnel diode switching circuits and makes operation at gigacycle frequencies of any of these circuits difficult to attain by prior art techniques.

Accordingly, it is an object of this invention to provide improved switching systems which process information at gigacycle frequencies.

It is another object of this invention to provide improved switching systems which avoid the delays heretofore introduced by recovery time periods.

It is a further object of this invention to provide improved methods of arranging logic circuits which in certain cases results in a doubling of the information processing rate.

A switching system in accordance with the invention includes a plurality of bistable switching circuits arranged in a double row and a plurality of columns. The switching circuits are interconnected to form first and second interlaced groups by coupling the output of each switching circuit in each row to the input of the switching circuit in the next successive column in the opposite row. First and second trains of oppositely phased clock energizing pulses of a predetermined repetition rate are applied to the switching circuits in the first and second rows, respectively, to energize and deenergize each row of switching circuits alternately. Consequently, only every other switching circuit in each interlaced group is energized at any one time.

Digital information of double said predetermined repetition rate is applied simultaneously to the switching circuit in the first column of both rows and thus to the first switching circuit in each interlaced group. The energizing signal energizes one row and thus one of the two first column switching circuits. The digital information applied thereto is shifted into the one energized switching circuit and therefore into one of the two interlaced groups. The other first column switching circuit in the opposite row is deenergized at this time and cannot process the digital signal applied thereto. At the termination of the first energizing pulse, the row in which the said one switching circuit is located in deenergized and the said one switching circuit is reset. During this resetting time, the other row of switching circuits is energized and the first switching circuit in the second interlaced group receives the next information signal. Simultaneously, the digital information signal stored in the said one switching circuit is shifted to the second switching circuit in this first interlaced group because this circuit is located in the energized row. Thus digital information signals are shifted alternately into the two interlaced groups permitting information to be processed at double the normal rate of operation of the switching circuits.

Figure 1:
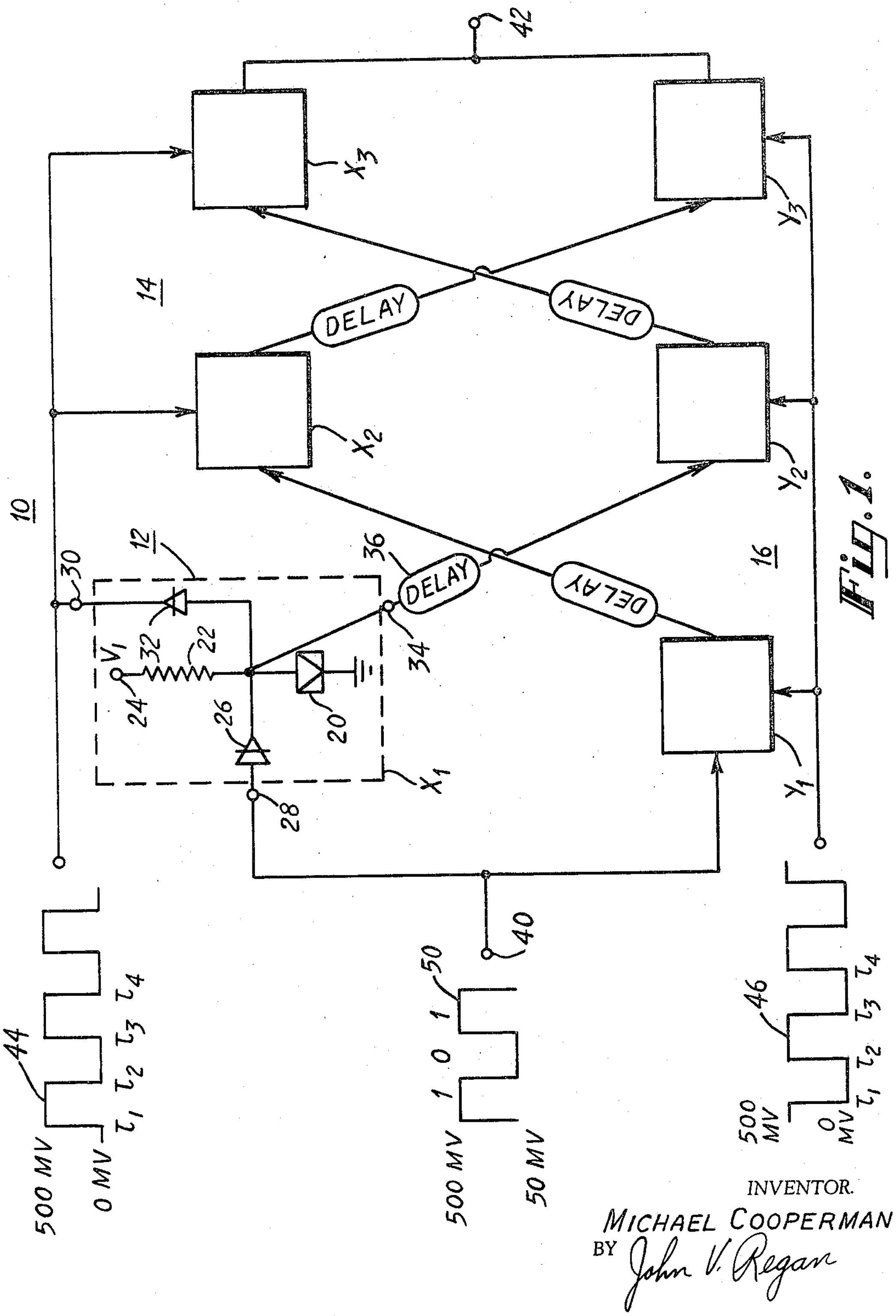
FIGURE 1 is a block diagram of a shift register switching system in accordance with the invention and which includes a schematic circuit diagram of one stage therein.

Referring now to FIGURE 1, a shift register switching system 10 includes a plurality of switching circuits 12 arranged in a plurality of columns and in a double row. The switching circuits 12 in the first or top row 14 are labeled $X_1$, $X_2$, $X_3$, whereas the switching circuits 12 in the second or bottom row 16 are labeled $Y_1$, $Y_2$, $Y_3$. For convenience, only three switching circuits 12 are shown in each row; in practice, more or less than three circuits 12 may be utilized in each row.

Figures 2, 3, 7:
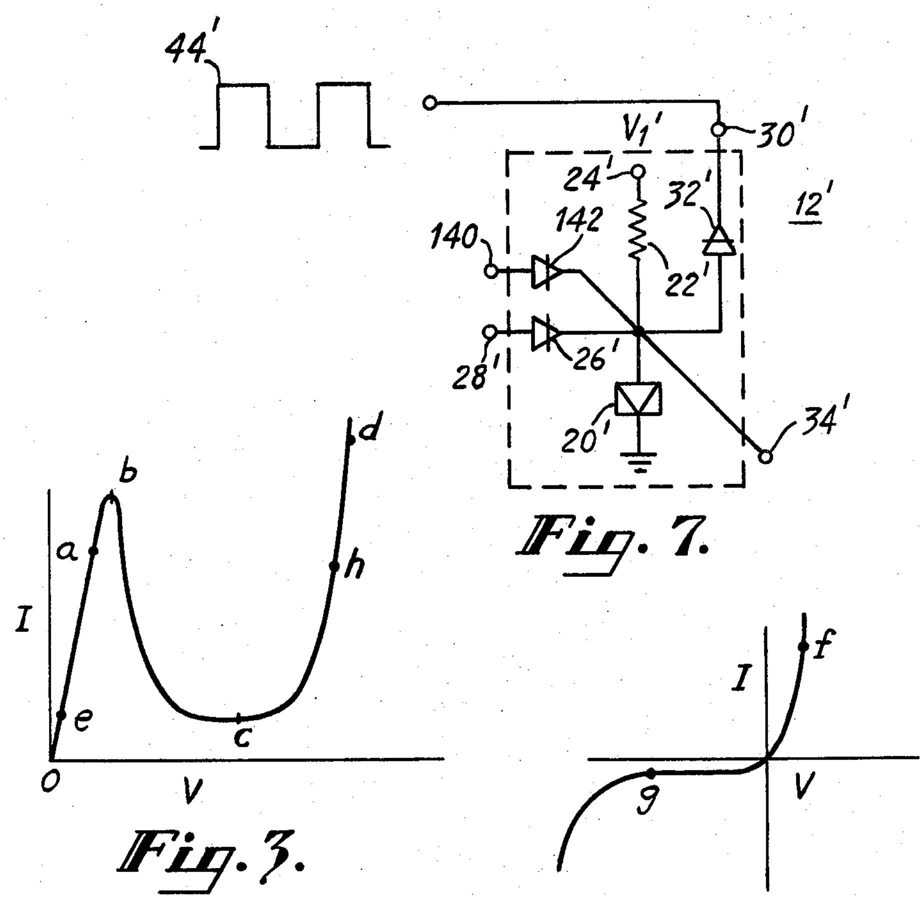
FIGURE 2 is a graph illustrating the current-voltage characteristic of a tunnel rectifier.
FIGURES 3 and 4 are graphs illustrating the current-voltage characteristic of tunnel diodes.
FIGURE 7 is a schematic circuit diagram illustrating the manner in which a stage of the shift register in FIGURE 1 is altered to function as an AND gate and alternatively as an OR gate; and, FIGURE 8 is a block diagram of a counter stage in accordance with the invention.

Each stage or switching circuit 12 in the system 10 includes a tunnel diode which functions as the active switching and storing element in the stage. Thus, the switching circuit $X_1$ in the top row 14 is typical and includes a tunnel diode 20 which is connected in series with a biasing resistor 22 across a power supply $V_1$. The positive terminal 24 of the power supply $V_1$ is connected through the resistor 22 to the anode of the diode 20, whereas the negative terminal thereof (not shown) is connected through circuit ground to the cathode of the diode 20. The power supply $V_1$ and resistor 22 are selected to bistably bias the diode 20. As indicated in FIGURE 3, the diode 20 quiescently operates in the first positive resistance region of its current-voltage characteristic such as at a point *a* below the peak current point *b* of this diode. The biasing of the tunnel diode 20 at the point *a* insures that an input signal applied to this diode will cause the operating point of the diode 20 to switch through the negative resistance region, as represented by the region between the points *b–c* of FIGURE 3, over to the second positive resistance region, as represented by the region between the points *c–d*.

A tunnel rectifier 26 is connected between an input terminal 28 for the switching circuit 12 and the anode of the diode 20. The tunnel rectifier 26 is poled so that the anode thereof is connected to the terminal 28 so as to exhibit a low impedance to a positive-going signal applied to the terminal 28. The switching circuit 12 also includes a clock energizing signal input terminal 30. The clock terminal 30 is coupled through a tunnel rectifier 32 to the anode of the tunnel diode 20. The tunnel rectifier 32 is poled so that the cathode thereof is connected to the clock terminal 30 so as to present a high impedance to positive-going signals applied to the terminal 30. A connection from the anode of the tunnel diode 20 provides an output terminal 34 for the switching circuit 12. All of the other switching circuits 12 are identical to the one described.

The first 14 and second 16 rows of switching circuits 12 are cross coupled to form two interlaced groups of circuits. Accordingly, the output terminal 34 of the switching circuit $X_1$ in the top row 14 is coupled through a delay circuit 36 to the input terminal of the switching circuit $Y_2$ in the bottom row 16. Similarly, the output terminal of each switching circuit in each row is connected through a storage or delay circuit to the input terminal of the switching circuit in the next successive column in the opposite row. Each of the storage or delay circuits may be the normal connections between the tunnel diodes rather than a specific delay line. The first interlaced group of switching circuits 12 include $X_1$, $Y_2$ and $X_3$, whereas the second interlaced group includes $Y_1$, $X_2$ and $Y_3$.

The input terminals of the switching circuits $X_1$ and $Y_1$ in the top and bottom rows are connected together to provide an information signal input terminal 40 for the switching system 10. Similarly, the output terminals of the switching circuits $X_3$ and $Y_3$ are connected together to provide an information signal output terminal 42 for the switching system 10. A first clock energizing signal 44 is applied to the clock terminals 30 of the switching circuits in the first row 14 of the system 10. The first clock energizing signal 44 comprises a train of substantially square wave pulses derived from any suitable pulse source which is not shown. A second clock energizing signal 46 is applied to the clock terminals of the switching circuits in the second row 16 of the system 10. The second clock energizing signal 46 is oppositely phased to the first clock signal 44. Thus, when the first row 14 of switching circuits has applied thereto a positive-going clock signal, the second row 16 has applied thereto a negative-going clock signal. The switching system 10 may, for example, be operated as a shift register and will be described as such.

In describing the operation of the circuit of FIGURE 1, it will be assumed that an input signal similar to the signal 50 is applied to the input signal terminal 40 of the switching system 10. The input signal 50 is a digital information signal having two levels which represent the binary numbers "0" and "1," respectively. The lower or binary "0" level is approximately 50 millivolts to correspond to the voltage exhibited by a tunnel diode when operating in the first positive resistance region (i.e., region 0–*b*, FIGURE 3). The upper or binary "1" level is substantially 500 millivolts in magnitude to correspond to the voltage exhibited by a tunnel diode when operated in the second positive resistance region (i.e., region *c*–*d*, FIGURE 3). The clock signals 44 and 46 may, for example, exhibit upper and lower levels of 500 millivolts and 0 volts, respectively.

When the lower level of the energizing signal 44 is applied to the clock terminal 30 of the switching circuit $X_1$, the tunnel diode 20 is operating in its first positive resistance region, such as the point *e* in FIGURE 3. Most of the current from the biasing source $V_1$ is diverted through the tunnel rectifier 32. This is because the tunnel rectifier 32 is forwardly biased to operate at a low impedance point, such as the point *f* in FIGURE 2. When operating at the point *f*, the tunnel rectifier 32 shunts the tunnel diode 20 with a low impedance and diverts the biasing current away from the tunnel diode 20. The tunnel diode 20 is therefore effectively deenergized as well as disabled. When the clock signal 44 goes positive, the tunnel rectifier 32 is reverse biased to operate at a point such as *g* in FIGURE 2. When operating at the point *g*, the rectifier 32 exhibits a substantial impedance to the bias source $V_1$. Therefore, substantially all of the biasing current flows through the tunnel diode 20 and shifts the point of operation of the diode 20 to the point a in FIGURE 3. The input terminal 40 has applied thereto a binary "1" input pulse which is the initial bit in the input signal 50. The magnitude of the binary "1" input pulse is sufficient to increase the current through the diode 20 above the peak current point *b* in FIGURE 3. When the current exceeds the current peak point *b*, the tunnel diode 20 operating point switches through the negative resistance region to a point such as *h*. The voltage across the tunnel diode 20 therefore increases and a positive step in voltage is coupled out through the output terminal 34 and applied to the storage or delay circuit 36. During this time, the switching circuit $Y_1$ is deenergized so that the binary "1" input pulse cannot switch this circuit.

After switching to the point *h*, the operating point of the tunnel diode 20 in the circuit $X_1$ falls back to near the point *c*. Thus, bistable storage properties are exhibited by the switching circuits 12. At the termination of the high level clock pulse 44 (i.e., at time $t_2$) which is substantially coincident with the termination of the input pulse, the tunnel diode 20 is switched back to operation at the point *e* in FIGURE 3. This occurs because most of the bias current from the source $V_1$ is diverted away from diode 20 when the tunnel rectifier 32 is forward biased by the low level exhibited by the clock signal 44. This disabling of the switching circuit $X_1$ is simultaneously accompanied by the enabling of the switching circuits in the bottom row 16. The clock signal 46 goes high when the clock signal 44 goes low. Thus, the tunnel diodes in the switching circuits $Y_1$ and $Y_2$ are operated near their current peak points. However, the tunnel diode in switching circuit $Y_1$ does not switch high because the second bit in the input signal 50 is a binary "0" and there is no greater current available to switch this diode. Accordingly, the circuit $Y_1$ remains in its low state and a binary "0" is stored in this circuit. Thus, binary information is entered into the register 10 during the time the circuit $X_1$ is being reset and the rate of processing information is effectively doubled. The switching circuit $Y_2$ switches high because the binary "1" previously stored in the switching circuit $X_1$ is shifted to the circuit $Y_2$. The positive step caused by the switching of the tunnel diode 20 in circuit $X_1$ traverses the delay circuit 36 to arrive at the input terminal of the switching circuit $Y_2$ at a time during which this circuit is energized by the clock signal 46. Therefore, the tunnel diode in the switching circuit $Y_2$ is switched high by this delayed signal. Thus, at the time $t_3$ at the termination of the high level clock signal 46, there is a binary "1" stored in circuit $Y_2$ and a binary "0" stored in circuit $Y_1$. It is to be noted that all of the binary information stored in the system 10 at this time is stored in the bottom row 16 circuits. Additionally, the binary information is stored in two interlaced groups and each alternate binary information bit enters the same group and remains in this group during shifting through the register 10. The interlacing insures that a deenergized switching circuit follows an energized switching circuit in each group. Thus, information cannot ripple through the register 10 and consequently, no interstage gating is required in the system 10.

The third binary "1" in the input signal 50 is advanced into the switching circuit $X_1$ when the switching circuits 12 in the top row 14 are energized by the clock signal 44 at the time $t_3$. Simultaneously, the binary "1" previously stored in $Y_2$ is shifted to $X_3$ and the binary "0" previously stored in $Y_1$ is shifted to $X_2$. Thus, all of the information bits in the input signal 50 are stored in the top row of the register 10. Permanent storage may be achieved by keeping the clock signal 44 high at this time. When the clock signal 44 is kept at the high level thereof, the tunnel diodes remain in the region *c–d* of FIGURE 3 if a binary "1" is stored therein due to the bistable biasing of the diodes by the supply $V_1$ and resistor 22. The diodes remain in the region 0–*b* of FIGURE 3 if a binary "0" is stored therein. To accomplish storage, the clock signals 44 and 46 may be applied through gated flip-flops to the system 10 and the gate closed to keep the flip-flop at one level. The information stored in the register 10 may be shifted out after storing for a period of time by opening the gates and applying the bilevel clock signals 44 and 46 to the register 10. The output is derived in serial form from the output terminal 42 which is common to both interlaced groups.

The delay circuits 36 in the system 10 are not always required. Frequently, the switching systems exhibit an adequate delay in the normal coupling connections between stages when operated at gigacycle frequencies. It is to be noted that the energizing signal performs a three-fold function; it energizes and biases the tunnel diodes, it shifts the information stored in the register, and it clocks the information transfer. By utilizing the switching system 10. tunnel diode logic circuits, which are designed to normally operate at 500 megacycles, have been able to process information at a one gigacycle rate.

Figure 5:
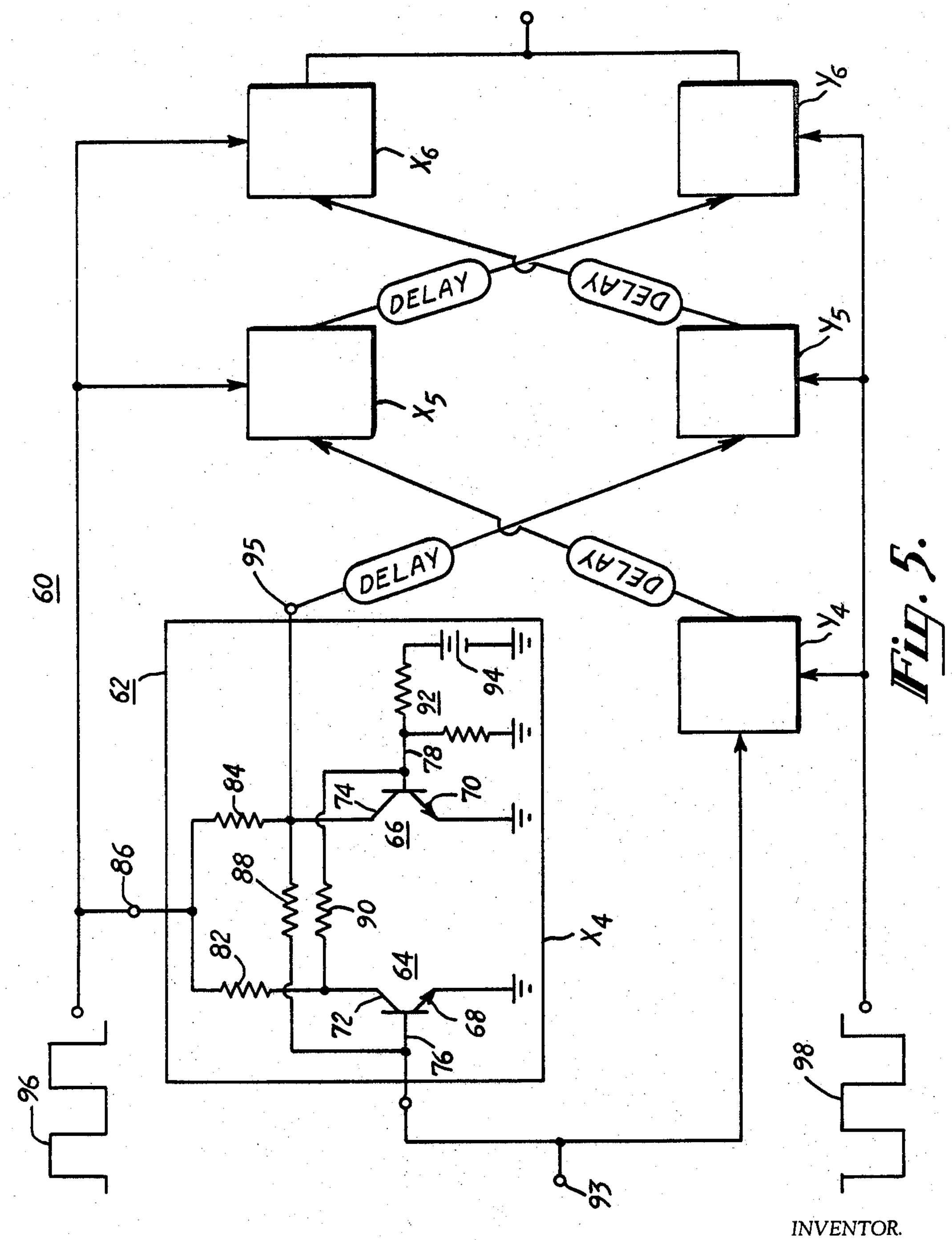
FIGURE 5 is a block diagram of another embodiment of a shift register switching system in accordance with the invention and which includes a schematic circuit diagram of one stage therein.

Referring now to FIGURE 5, there is shown a system 60 which includes transistor flip-flop switching circuits 62 which are utilized as the storage devices in a shift register system. Each switching circuit 62 includes a pair of NPN transistors 64 and 66 which are cross coupled to function as a bistable flip-flop. The transistors 64 and 66 include, respectively, emitters 68 and 70, collectors 72 and 74, and bases 76 and 78. The emitters 68 and 70 of each transistor 64 and 66 are connected directly to ground, whereas the collectors 72 and 74 thereof are connected through load resistors 82 and 84, respectively, to an energizing terminal 86. The transistors are cross coupled by connecting the collector 74 of the transistor 66 through a resistor 88 to the base 76 of the transistor 64 and the collector 72 of the transistor 64 through a resistor 90 to the base 78 of the transistor 66. The base of the transistor 66 is biased by coupling this electrode to the junction of a voltage divider 92 connected across a battery 94. An input signal at input terminal 93 is applied directly to the base 76 of the transistor 68, whereas an output signal is derived from a terminal 95 connected to the collector 74 of the transistor 66. The switching circuits in the top row of the system 60 are labeled $X_4$, $X_5$ and $X_6$, whereas the switching circuits in the bottom row are labeled $Y_4$, $Y_5$ and $Y_6$. The top and bottom rows are cross coupled through storage or delay circuits to provide two interlaced groups in a manner identical to the system 10 in FIGURE 1. A first train of clock energizing signals 96 is applied to the top row of switching circuits, whereas a second train of oppositely phased clock energizing signals 98 is applied to the bottom row of the switching circuits.

It is to be noted that the switching circuits 62 are deenergized when the clock energizing signals are low and energized when the energizing signals go high. Thus, the clock energizing signals 96 and 98 perform the same function as a biasing source. It is also to be noted that the base bias battery 94 biases the transistor 66 to conduction in the absence of an input signal at the base of transistor 64 when the energizing signal 96 energizes the circuit 62. The conduction of the transistor 66 causes the output terminal 95 to exhibit a potential of substantially ground level which represents a binary "0." Thus, the flip-flop 62 is biased to exhibit a binary "0" in the absence of a binary "1" input signal.

In operation, an input signal is applied simultaneously to the switching circuit $X_4$ and $Y_4$ in the first and second rows of the system. The switching circuit $X_4$ in the top row is energized while the switching circuit $Y_4$ in the bottom row is deenergized. If the input signal applied to the flip-flop $X_4$ is a binary "1," the current into the base of the transistor 64 exceeds the base bias current of the transistor 66 and the transistor 64 conducts more heavily than the transistor 66. The negative-going signal at the collector 72 of the transistor 64 is coupled through the resistor 90 to cut off the transistor 66. The nonconduction of the transistor 66 causes the output terminal 95 to exhibit the same high level voltage as the energizing signal 96 and the circuit $X_4$ stores a binary "1" signal. At the termination of the energizing signal pulse 96, the switching circuit $X_4$ is completely deenergized and consequently this circuit is reset. The binary "1" signal is shifted through the delay circuit to the switching circuit $Y_5$ of the bottom row when the energizing signal 98 goes high. Simultaneously the circuit $Y_4$ is also energized to receive the next binary input signal.

When a binary "0" input signal is applied to the circuit $X_4$, the absence of a high level input signal on the base of transistor 64 allows the battery 94 to bias the transistor 66 into conduction. The circuit $X_4$ in this state stores a binary "0" signal.

It is apparent that the energizing signal 96 in FIGURE 5 also performs a three-fold function. The signal 96 energizes and biases the circuit $X_4$ for bistable operation; shifts the stored information signal; and resets the circuit $X_4$ by deenergizing this circuit entirely. Binary information can be stored in the register 60 by maintaining the energizing signal 96 or 98 at the high or energizing level.

Figure 6:
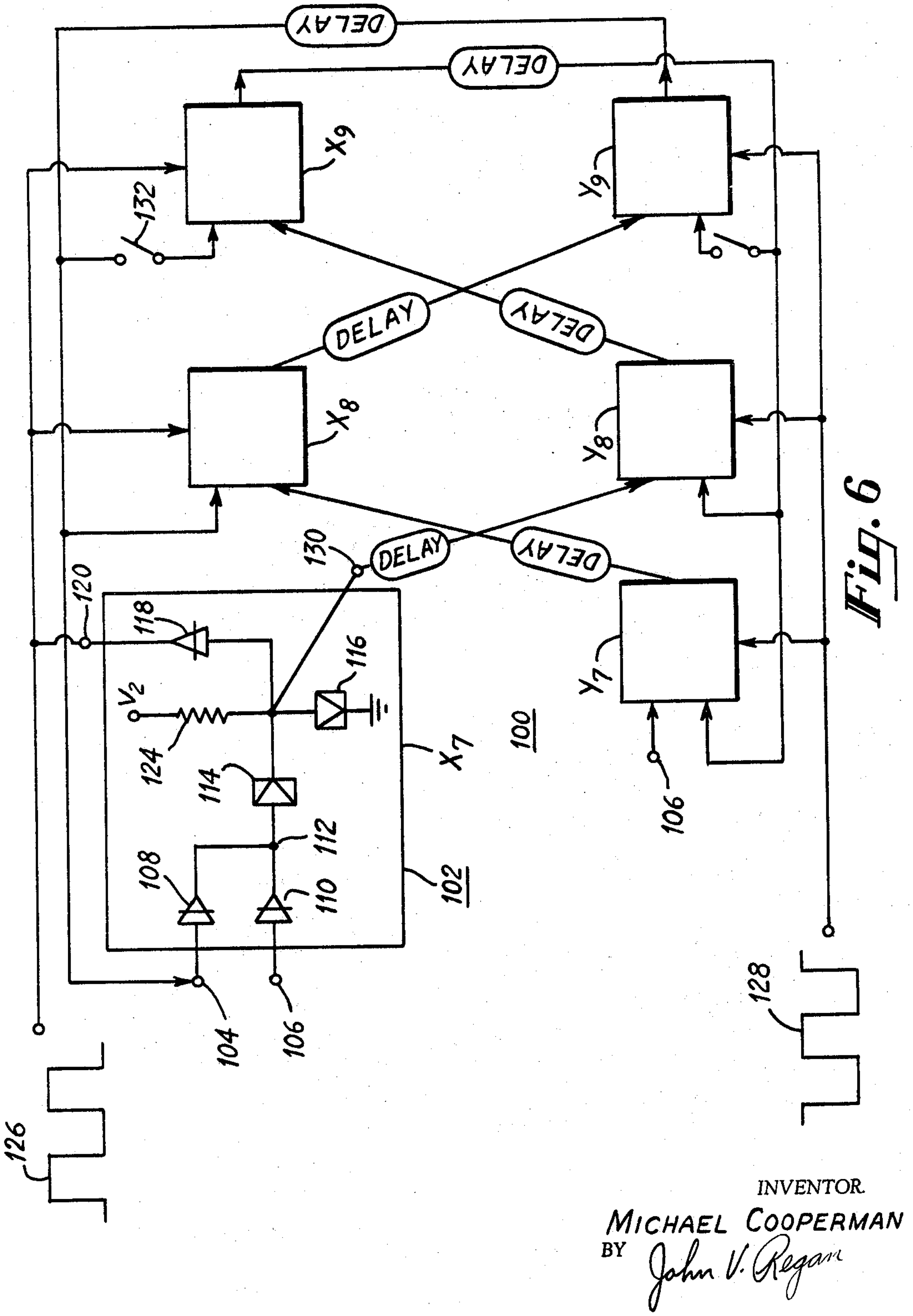
FIGURE 6 is a block diagram of a sequence generator in accordance with the invention and which includes a schematic circuit diagram of one stage therein.

Referring now to FIGURE 6, a sequence generator utilizing a switching system in accordance with the invention is illustrated. The sequence generator 100 includes a plurality of generator stages 102. The generator stages function as EXCLUSIVE OR gates with bistable storage characteristics. Each stage 102 includes a pair of input terminals 104 and 106. Tunnel rectifiers 108 and 110 are connected, respectively, between these terminals and a junction point 112. The anodes of the tunnel rectifiers 108 and 110 are connected, respectively, to the terminals 104 and 106, whereas the cathodes of these rectifiers are connected to the junction point 112 to present a low impedance to positive-going signals applied to the signal input terminals. First and second tunnel diodes 114 and 116 are serially connected together between the junction point 112 and ground. A tunnel rectifier 118 is connected from the anode of the diode 116 to an energizing signal input terminal 120. The rectifier 118 has its cathode connected to the terminal 120 to present a high impedance to negative-going signals applied to this terminal.

Figure 4:
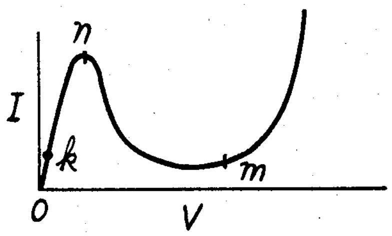

The first tunnel diode 114 operates quiescently in a low voltage positive resistance region of its current-voltage characteristic such as the ponit *k* near the origin in FIGURE 4 because of the substantial absence of bias applied thereto. The second diode 116 is biased to operate quiescently in the low voltage positive resistance region of its current-voltage characteristic, such as at the point *a* in FIGURE 3, by coupling the anode thereof through a bias resistor 124 to the source of positive potential $V_2$. The diodes 114 and 116 operate in their low voltage region until the input current exceeds the current peak points *n* and *b* in FIGURES 4 and 3, respectively. When the curent peak points are exceeded, the operating points of the diodes 114 and 116 are switched through the negative resistance region to operate in the high voltage regions, such as near the points *m* and *c* in FIGURES 4 and 3, respectively. The circuits 102 in the top row of the system 100 are energized by a train of energizing pulses 126 applied to the terminal 120. A train of oppositely phased energizing pulses 128 are applied to energize the bottom row of stages. An output terminal 130 for the circuit 102 is obtained by coupling from the anode of the diode 116. For convenience, the generator stages 102 in the top row of the system 100 are labeled $X_7$, $X_8$ and $X_9$, whereas the generator stages 102 in the bottom row are labeled $Y_7$, $Y_8$ and $Y_9$.

To operate as a sequence generator the output terminal 130 of each circuit in each row is coupled through a delay circuit to the input terminal 106 of the circuit 10 in the next successive column in the opposite row. However, the output terminal 130 of the last stage in each row (i.e., $X_9$, $Y_9$) is fed back to the input terminal 104 of the stages in the opposite row with the exception that no feedback is applied to the last stages themselves (i.e., $X_9$, $Y_9$). A switch 132 in each of the stages $X_9$, $Y_9$ is opened to prevent feedback thereto. The switching circuit system 100 may have many more stages than the three shown and a switch 132 is incorporated in each stage to permit enlarging or decreasing the length of the generator. The switches 132 also change the sequence which is generated.

Each circuit 102 functions as an EXCLUSIVE OR circuit, in that when one and only one binary "1" input signal is applied to the terminals 104 and 106 then a binary "1" output signal is derived from the output terminal 130. Thus, when a binary "1" input signal is applied to one of the terminals 104 and 106 and a binary "0" signal to the other, the tunnel diode 114 will not shift over the peak point *n* of its current-voltage characteristic because the diode 114 is selected with a peak point *n* to insure that no switching occurs. However, the diode 116 is operating at the point *e* in the absence of a clock energizing signal and at the point *a* in the presence of a clock energizing signal 126. The input signal therefore causes this diode to switch over its current peak point *b* to the second positive resistance or high voltage region. The removal of the energizing clock pulse causes the diode 116 to switch back to quiescent operation at the point *e* in its low voltage region.

When a pair of binary "1" input signals are applied to the terminals 104 and 106, the combined input signals cause the current through the tunnel diode 114 to exceed the current peak point *n* and the operating point switches over the current peak point to the second positive resistance or high voltage region thereof. The switching of diode 114 to the high voltage region prevents the two binary "1" input signals from being applied to the diode 116 and, accordingly, this diode remains operating in its low voltage state. Alternatively, when a pair of binary "0" input signals are applied to the terminals 104 and 106, neither of the diodes 114 and 116 switches to operation in the high voltage region thereof. When the EXCLUSIVE OR stages are interconnected as a sequence generator, the terminal 106 on the first stages $X_7$ and $Y_7$ and the terminal 104 on the final stages $X_9$ and $Y_9$ have no signals applied to them. If desired, the unused terminals can be connected to a source of "0" bias input voltage.

In operation, it is assumed that all of the stages in the top row of the sequence generator 100 store binary "1" signals. Accordingly, when the first energizing signal pulse from the pulse train 128 is applied to energize the stages in the bottom row, the first stage $Y_7$ has applied thereto only one binary "1" input signal from the stage $X_9$ which causes this stage to exhibit a binary "1" output signal. The second stage $Y_8$ in the bottom row of the sequence generator has applied thereto a pair of binary "1" input signals which causes this stage to exhibit a binary "0" output signal. Similarly, the last stage $Y_9$ in the bottom row of the sequence generator 100 has only one binary "1" input signal applied thereto, so this stage also exhibits a binary "1" output signal. Thus, at the end of the first energizing pulse 128 the sequence is 101 in the bottom row of the generator 100. The other sequences of the sequence generator are listed in Table I below.

TABLE I

| Energizing Pulse | $X_7$ | $Y_7$ | $X_8$ | $Y_8$ | $X_9$ | $Y_9$ |
|---|---|---|---|---|---|---|
| 0 | 1 | — | 1 | — | 1 | — |
| 1 | — | 1 | — | 0 | — | 1 |
| 2 | 1 | — | 0 | — | 0 | — |
| 3 | — | 0 | — | 1 | — | 0 |
| 4 | 0 | — | 0 | — | 1 | — |
| 5 | — | 1 | — | 1 | — | 0 |
| 6 | 0 | — | 1 | — | 1 | — |
| 7 | — | 1 | — | 1 | — | 1 |

In this table a dash (—) means that the particular stage is deenergized and the information is instead being processed by the other energized stages. It is important to note that by utilizing a large number of stages the numbers generated by the generator 100 do not repeat themselves within a reasonable length of time so that such a generator is effectively a pseudo random sequence generator.

Referring to FIGURE 7, there is illustrated a gate 12′ which may function either as an OR gate or as an AND gate depending on the biasing and energizing of this circuit. It is to be noted that the gate 12′ is similar to the shift register stage 12 of FIGURE 1 and therefore has been given the same, but primed, reference numerals. The gate 12′ differs from the stage 12 in providing a second input terminal 140 connected through a forwardly poled tunnel rectifier 142 to the anode of the tunnel diode 20′. When the gate 12′ is operated as an AND gate, the gate 12′ is biased such that two input signals, applied to the terminals 140 and 28′, respectively, are required to switch the diode 20′ over its current peak point *b* to its high voltage region. When the gate 12′ is operated as an OR gate, the gate 12′ is biased such that only one input signal applied to either of the terminals 140 and 28′ is sufficient to switch the diode 20′ over its current peak point *b* to its high voltage region.

Figure 8:
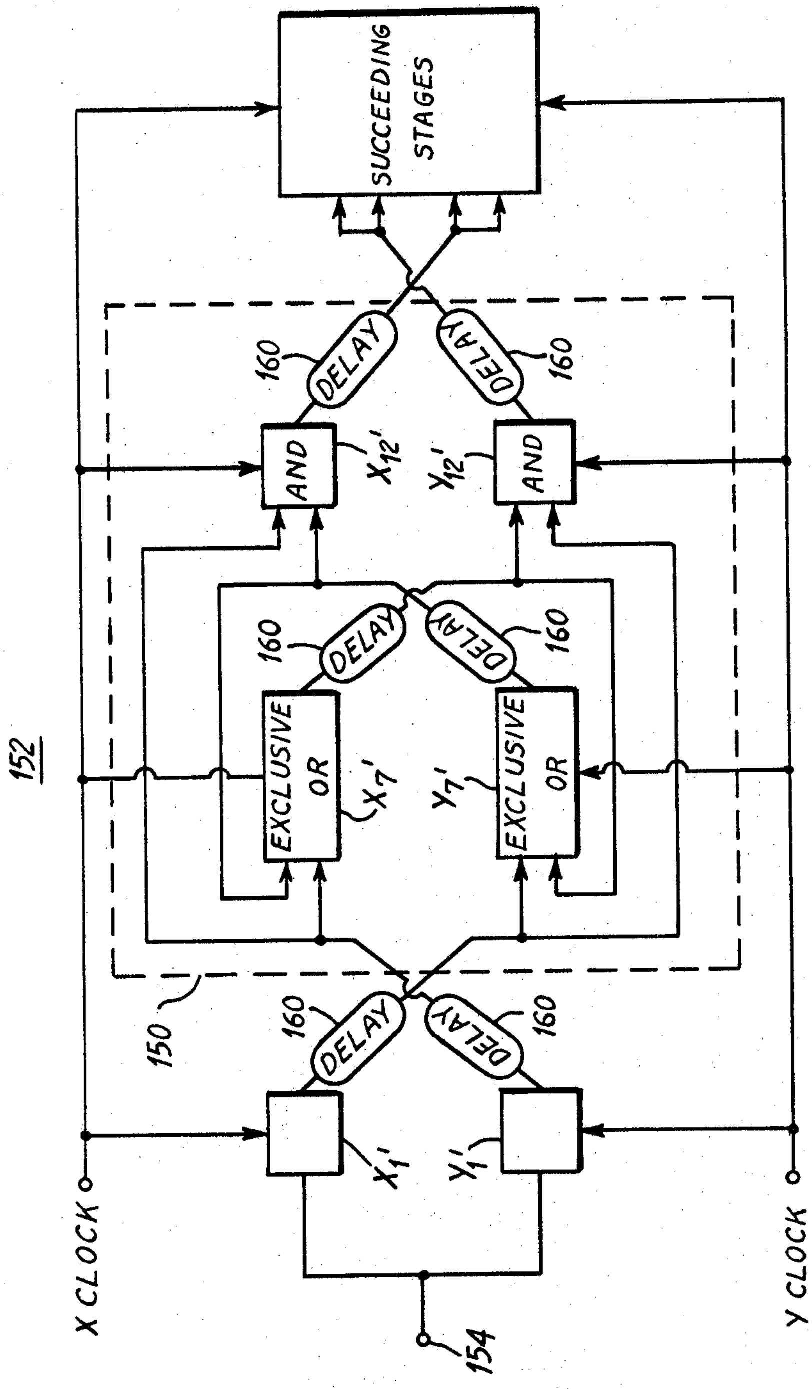

In FIGURE 8 there is illustrated a circuit which interconnects an EXCLUSIVE OR circuit and an AND gate to provide a counter stage 150 for a binary counter 152 capable of counting in the gigacycle frequency range. The EXCLUSIVE OR circuit $X_{7'}$ is identical to one of the circuits 102 in FIGURE 6, whereas the AND gate $X_{12'}$, is identical to the gate 12′ in FIGURE 7. Successive stages have identical circuits connected in the same manner as the stage 150 in FIGURE 8. Serial input pulses to be counted are applied to the input terminal 154. Shift register stages $X_{1'}$ and $Y_{1'}$ are connected to the terminal 154 to break the serial input pulses into two chains for counting by the upper and lower levels of the counter 152. The stages $X_{1'}$ and $Y_{1'}$ are identical to the stages $X_1$ and $Y_1$ in FIGURE 1. The first stage is the only stage which requires the shift register stages $X_{1'}$ and $Y_{1'}$. The various components in FIGURE 8 are interconnected by delay circuits 160.

Input pulses to be counted may, for example, be derived from a shift register 10, as shown in FIGURE 1, or some other logic system compatible with the counter 152. The first input pulse may, for example, cause the stage $Y_{1'}$ to switch high to store a binary "1." The next clock pulse then causes the input pulse to be transferred to the EXCLUSIVE OR stage $X_{7'}$. The stage $X_{7'}$ switches high to store a binary "1" because only one of the two inputs applied thereto is a binary "1." The other input from the other EXCLUSIVE OR stage $Y_{7'}$ is low. Thus, the first input pulse is counted. Successive input pulses are counted by the counter 152 to provide a binary counter for a logic system in accordance with the invention.

Thus, in accordance with the invention, a complete logic switching system is provided which permits doubling the processing rate of information through the system without, however, requiring twice the number of components, because no interstate coupling gates are required.

What is claimed is:

1. A sequence generator comprising, in combination, a plurality of bistable switching circuits arranged in first and second rows and cross coupled to form first and second interlaced groups, a plurality of switches, means including said switches for coupling the last bistable switching circuit in each of said first and second rows to preceding bistable switching circuits in the other of said rows, and means for applying first and second oppositely phased energizing clock signals of a predetermined frequency to alternately enable and disable said first and second rows of switching circuits, respectively, whereby the disabling of a switching circuit in one row causes the enabling of a corresponding switching circuit in the opposte row so that a sequence of bstable states is generated at twice said predetermined frequency.

2. A switching system comprising in combination, first and second rows of normally deenergized bistable switching circuits with each having an input and an output, coupling means for coupling the output of each bistable circuit in each of said rows to the input of the next successive bistable circuit in the oppoiste row so as to form first and second interlaced groups of bistable switching circuits, means for unconditionally applying input signals of a predetermined frequency to the first bistable circuit in each of said first and second interlaced groups, means providing first and second trains of complementary clock signals of a frequency one half that of said predetermined frequency with each train of signals having a first level selected to energize said bistable circuits to enable said bistable circuits to be set during the receipt of an input signal of one value and a second level selected to deenergize said bistale circuits to unconditionally reset said bistable circuits, and means for unconditionally applying said first and second trains of clock signals to the bistable circuits in said first and second rows respectively so that the receipt of an input signal of said one value during the energization of the first bistable circuit in said first row sets said first bistable circuit whereas during the resetting of said first bistable circuit the next input signal is applied to the first bistable switching circuit in said second row causing input signals to be entered alternately into said first and second interlaced groups of bistable circuits at double the frequency of said train of clock signals.

3. The combination in accordance with claim 2 wherein said coupling means comprises, delay storage means for storing a signal during the deenergization of said bistable circuits.

4. The combination in accordance with claim 2 wherein said bistable switching circuits each comprises, a tunnel diode normally deenergized to a reset state so that the application of a clock signal of said first level energizes said tunnel diode to enable switching of said tunnel diode to a set state upon the receipt of an input signal of said first value and the application of a clock signal of said second level deenergizes said tunnel diode to unconditionally return said tunnel diode to said reset state.

5. The system in accordance with claim 2 wherein said bistable switching circuits each comprises, a pair of normally deenergized transistors cross-coupled to operate as a bistable switching circuit when energized, and means for biasing one of said transistors to cause said bistable circuit to operate in a reset state during the energization of said transistors by said train of clock signals and in the absence of an input signal of said first value.

References Cited

UNITED STATES PATENTS 3,050,714 8/1962 Campbell --------- 328—37 X

JOHN S. HEYMAN, *Primary Examiner.*

ARTHUR GAUSS, *Examiner.*

D. D. FORRER, *Assistant Examiner.*